Patented Oct. 6, 1953

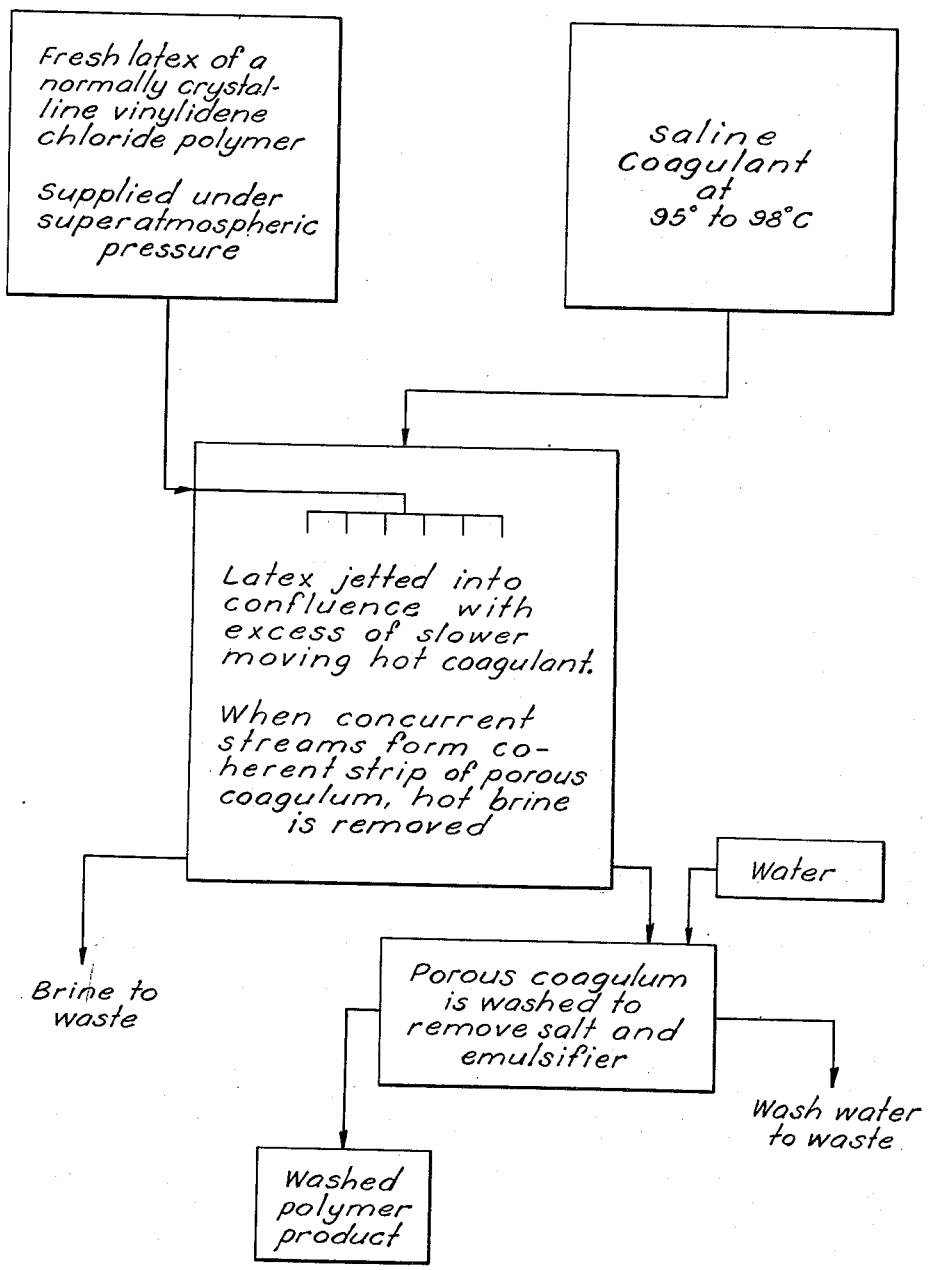

2,654,730

UNITED STATES PATENT OFFICE 2,654,730

COAGULATION AND WASHING OF NORMALLY CRYSTALLINE VINYLIDENE CHLORIDE POLYMER EMULSIONS

Harold W. Moll, Midland, Mich., assignor to The Dow Chemical Company, Midland, Mich., a corporation of Delaware Application October 18, 1951, Serial No. 251,987

4 Claims. (Cl. 260—87.7)

This invention relates to an improved method for coagulating and washing the polymer and the normally crystalline copolymers of vinylidene chloride, when produced in the form of aqueous latex-like emulsions or dispersions.

The term "normally crystalline vinylidene chloride polymer" is used herein, as elsewhere in the art, to refer not only to the homopolymer of vinylidene chloride, but also to all copolymers with other mono-ethylenically unsaturated compounds in which vinylidene chloride predominates to such an extent that, like the vinylidene chloride homopolymer, they exhibit submicroscopic crystallinity as evidenced by their X-ray diffraction patterns.

When a normally crystalline vinylidene chloride polymer is produced in aqueous emulsion, it has been found difficult to free the polymer, after coagulation, from the electrolyte used to coagulate the emulsion, and from other impurities. The coagulum is often slimy or pasty, and impurities which should be soluble in water are held tenaciously by the coagulum. Such a mass cannot be washed free of electrolyte and remaining emulsifier, and, when dried for use in molding or extrusion operations, shows evidence of the impurities in the inferior properties of the molded or extruded articles.

It is an object of the invention to provide a method for coagulation of an emulsion of a normally crystalline vinylidene chloride polymer in which the coagulum is obtained in a condition in which it may be washed easily to effect complete removal of the coagulating electrolyte and emulsifier.

The method of the invention is illustrated diagrammatically in the annexed drawing.

The stated object may be accomplished readily, it has been found, by introducing a thin stream of the latex-like emulsion of a freshly polymerized normally crystalline vinylidene chloride polymer under a velocity due to a superatmospheric discharge pressure of from about 5 to 30 pounds per square inch (absolute pressure of about 20 to 45 pounds) into confluence with a less rapidly moving stream of an excess of a hot aqueous brine which is kept at a temperature from 90° to 98° C. The coagulum spreads out in the coagulating trough and moves with the hot brine as a porous but coherent plaited sheet. When coagulation is complete, the strip of coagulated polymer is separated from the brine, and washed with an excess of water, either before or after being crumbled into porous particles. The salt and emulsifier are removed completely, and the product gives clear moldings, indicative of its purity.

The described coagulation process must be applied to the latex shortly after polymerization is complete and before the polymer has crystallized completely. Thus, an emulsion homopolymer of vinylidene chloride which is at room temperature must be coagulated within an hour after it is polymerized, and normally crystalline copolymers of vinylidene and vinyl chlorides, stored at room temperature, can be coagulated successfully by the process only if the treatment is applied within the approximate time shown in the following table which is based on assumed aging at room temperature. High temperature storage shortens the useful life of the latex in this process, and refrigeration temperatures tend to lengthen it.

| Monomer Ratio in Copolymer | | Approximate Age limit before coagulation, Hours |
|---|---|---|
| Vinylidene chloride, percent | Vinyl chloride, percent | |
| 100 | | 1 |
| 85 | 15 | 3 |
| 80 | 20 | 6 |
| 73 | 27 | 150 |

NOTE.—The 73–27 copolymer represents approximately the upper limit of vinyl chloride in a normally crystalline copolymer.

Similar limitations apply to the time within which the method must be used on latices of the normally crystalline copolymers of vinylidene chloride and such other monoethylenically unsaturated compounds as acrylonitrile, the esters of acrylic and methacrylic acid, vinyl acetate, styrene and the like. In all cases, the latex responds to the present treatment when freshly prepared and until crystallization has altered the characteristics of the polymeric particles. After crystallization, attempted coagulation gives a creamy or slimy paste which cannot be washed.

The latex must enter the stream of hot brine with a velocity such as would be imparted by a hydrostatic head of from 10 to 50 feet of the latex. Since the latex specific gravity may vary from 1.10 to 1.25, depending on its solids content and the composition of the dispersed polymer solids, this represents a pressure within the supply line at the point of discharge of from 5 to 30 pounds gage. Lower discharge velocities result in the formation of encapsulated particles of the polymer with a hard shell which prevents washing impurities from the product. Higher velocities may be used but are unnecessary.

The preferred coagulant is an aqueous solution of sodium chloride of from 12 to 25 per cent concentration. Other conventional saline electrolytes such as magnesium chloride or alum may be used, but ordinarily these are less economical and no more efficient. To obtain the required abrupt and complete coagulation and to form a porous and washable product, the temperature of the brine should be at least 90° C., and is preferably from 95° to 98° C. It is also necessary that the hot brine flows at a linear rate considerably less than that of the latex at the point of confluence of the two streams. The amount of brine used should be from 1 to 10 times the volume of the latex, and 3 to 5 volumes of brine for each volume of latex give consistently good results.

As a result of the higher initial velocity of the latex as compared with that of the coagulant, the coagulum, being heavier than the brine, settles to the bottom of the trough and spreads out, losing some of its momentum. By the time the brine and coagulum have reached the same velocity, the older coagulum offers resistance to the movement of that newly formed, and the coagulum builds up into a transversely plaited sheet through the folds of which the brine moves freely, completing the coagulation. If the latex is discharged into a more rapidly moving stream of coagulant, the desired result is not obtained. There is obtained, instead, a coagulated mass of balls or attenuated tubes, each having a hard shell and an uncoagulated liquid core. This condition must be avoided.

The following example illustrates the practice of the invention:

There was charged into a glass-lined kettle:

| | | |
|---|---|---|
| Pure water | pounds | 3000 |
| Monomeric vinylidene chloride | do | 850 |
| Monomeric vinyl chloride | do | 150 |
| Hydrogen peroxide, 30 vol | do | 33 |
| Dihexyl sulfosuccinic acid, sod. salt | do | 40 |
| Fe(NO₃)₃·9H₂O—12% solution | cc | 1400 |
| Nitric acid, concentrated | cc | 750 |

The mixture was agitated, to form an emulsion, and was heated at 36° C. for nearly 9 hours, by which time polymerization was about 85 per cent complete. Remaining monomeric vinyl chloride was vented, the latex-like emulsion was cooled to 28° C. in half an hour and was run at once under a gravity head of 30 feet to a horizontally disposed outlet containing a single row of 16 orifices, each 0.08 inch in diameter and spaced 0.5 inch between centers. These orifices were about 2 inches above the bottom of a horizontal coagulation trough. Disposed above and below the gang of jets for the latex were a pair of horizontally disposed slit orifices through which 22 per cent aqueous sodium chloride at 95°–98° C. was caused to flow. The latex streams thus fell to the bottom of the trough between two streams of coagulant. The coagulum was slowed by the brine, and assumed the previously described plaited appearance, as a coherent and continuous, but porous mass. After moving with the brine for about 5 feet, the coagulum was discharged on a slowly moving porous belt, being separated thereon from the hot brine. The sheet of polymer was now about 0.5 to 1 inch thick and about 10 inches wide. When cooled to room temperature the sheet of polymer was ground into porous curds which were about 44 per cent polymer and over 50 per cent water. These were washed with pure water in a basket centrifuge and were then dried in an air oven at 50° C. From 75 to 90 per cent of the expensive emulsifier could be recovered from the wash water. Compression molded test specimens were made from the copolymer and were clear, transparent and nearly colorless.

By way of contrast, a fresh sample of the same latex was poured into hot brine, with agitation, the slimy coagulatum was washed on a filter with water, and, after drying, was formed into compression molded bars of the same size as the others. These specimens were only translucent, and had a distinct yellow tinge, showing the presence of impurities. Less than 15 per cent of the emulsifier could be recovered from the wash water, adding considerably to the cost of the product.

Another sample of the same latex was aged for 8 hours at room temperature and, upon coagulation in an excess of flowing hot brine, gave a coagulum having the consistency of cold cream. This mass could not be washed free of salt or emulsifying agent, and moldings made from the dried product were nearly opaque.

I claim:

1. The method which comprises jetting freshly prepared latex-like dispersion of a normally crystalline vinylidene chloride polymer resulting from the emulsion polymerization of the corresponding monomeric material, before the polymer therein is substantially crystalline, into an excess of a confluent but slower moving stream of an aqueous saline coagulant which is at a temperature of about 95° to 98° C., the said polymer latex being supplied to its point of discharge into the coagulant under a superatmospheric pressure, causing the latex and brine to move together until a coherent mass of coagulum is formed, separating the hot brine from the porous, coherent strip of coagulum, and washing the coagulum with water to remove salt and emulsifier therefrom.

2. The method claimed in claim 1, wherein the coagulant is an aqueous solution of sodium chloride of from 12 to 25 per cent concentration.

3. The method claimed in claim 1, wherein the initial polymer dispersion is that of a copolymer made from a monomer mixture of 85 per cent vinylidene chloride and 15 per cent vinyl chloride.

4. The method claimed in claim 1, wherein the polymer latex is supplied under a superatmospheric perssure of about 10 to 30 pounds per square inch; the coagulant is an aqueous 12 to 25 per cent solution of sodium chloride, and the volume of coagulant employed is from 3 to 5 times that of the polymer emulsion.

HAROLD W. MOLL.

References Cited in the file of this patent

UNITED STATES PATENTS

| Number | Name | Date |
|---|---|---|
| 2,530,362 | Morris | Nov. 14, 1950 |
| 2,556,260 | Downing | June 12, 1951 |